United States Patent
Marilly et al.

(10) Patent No.: US 8,424,039 B2
(45) Date of Patent: Apr. 16, 2013

(54) METHOD FOR ADAPTING A COMMON USER PROFILE

(75) Inventors: Emmanuel Marilly, Nozay (FR); Gérard Delegue, Nozay (FR)

(73) Assignee: Alcatel Lucent, Paris (FR)

(*) Notice: Subject to any disclaimer, the term of this patent is extended or adjusted under 35 U.S.C. 154(b) by 465 days.

(21) Appl. No.: 12/293,721

(22) PCT Filed: Mar. 16, 2007

(86) PCT No.: PCT/FR2007/050935
§ 371 (c)(1), (2), (4) Date: May 20, 2010

(87) PCT Pub. No.: WO2007/107662
PCT Pub. Date: Sep. 27, 2007

(65) Prior Publication Data
US 2010/0229192 A1    Sep. 9, 2010

(30) Foreign Application Priority Data
Mar. 20, 2006  (FR) .................................... 06 50945

(51) Int. Cl.
*G06F 3/00* (2006.01)
*G06F 13/00* (2006.01)
*H04N 5/445* (2011.01)

(52) U.S. Cl.
USPC .................. 725/46; 725/47; 725/34; 725/13; 725/10; 709/223

(58) Field of Classification Search .......................... None
See application file for complete search history.

(56) References Cited

U.S. PATENT DOCUMENTS
6,530,083 B1 * 3/2003 Liebenow ........................ 725/46
2003/0126108 A1   7/2003 Martino et al.
(Continued)

FOREIGN PATENT DOCUMENTS
JP    2001-265904    9/2001
(Continued)

OTHER PUBLICATIONS

Yu, Zhiwen et al., "An Adaptive In-Vehicle Multimedia Recommender for Group Users," Vehicular Technology Conference, 2005, VTC 2005-Spring, 2005 IEEE 61$^{st}$ Stockholm, Sweden 30-01 May 2005, Piscataway, NJ, USA, IEEE, pp. 2800-2804, May 30, 2005.

(Continued)

*Primary Examiner* — Joshua Taylor

(74) *Attorney, Agent, or Firm* — Fay Sharpe LLP

(57) ABSTRACT

The invention concerns user profiles associated with terminals. It consists of a method for adapting a common user profile (4) used by a service provider of audio and/or video broadcast on a common terminal to customize the service provided, including: a step of detecting at least one new terminal (5, 6 or 7) in the neighborhood of the common terminal; a step of enabling at least one new terminal detected on at least one first condition that it is to remain in the neighborhood of the common terminal for a duration compatible with the customization of the service provided; a step of determining one or more user profiles corresponding to one or more new enabled terminals; a step of correlating one or more predetermined profiles with one or more parameters representing the common profile used by the service provider so as to obtain a new common user profile; a step of implementation, by the service provider, of said new common user profile at least if the new common user profile is sufficiently different from the common user profile used by the service provider, to modify the customization of the service provided.

16 Claims, 2 Drawing Sheets

U.S. PATENT DOCUMENTS

2005/0114493 A1* 5/2005 Mandato et al. .............. 709/223
2005/0278741 A1* 12/2005 Robarts et al. ................. 725/46

FOREIGN PATENT DOCUMENTS

| | | |
|---|---|---|
| JP | 2002-074153 | 3/2002 |
| JP | 2004-013195 | 1/2004 |
| JP | 2004-287296 | 10/2004 |
| JP | 2005-038323 | 2/2005 |
| JP | 2005-513688 | 5/2005 |
| WO | WO 02/077955 | 10/2002 |

OTHER PUBLICATIONS

Yu, Zhiwen et al., "User Profile Merging Based on Total Distance Minimization," ICOST 2004, $2^{nd}$ International Conference on Smart Homes and Health Telematics, XP007901150, pp. 1-8, Sep. 2004.
Salem, B. et al., "Multiple User Profile Merging (MUPE): Key Challenges for Environment Awareness," Ambient Intelligence, Second European Symposium, EUSAI 2004, Proceedings, pp. 196-206, Nov. 2004.

* cited by examiner

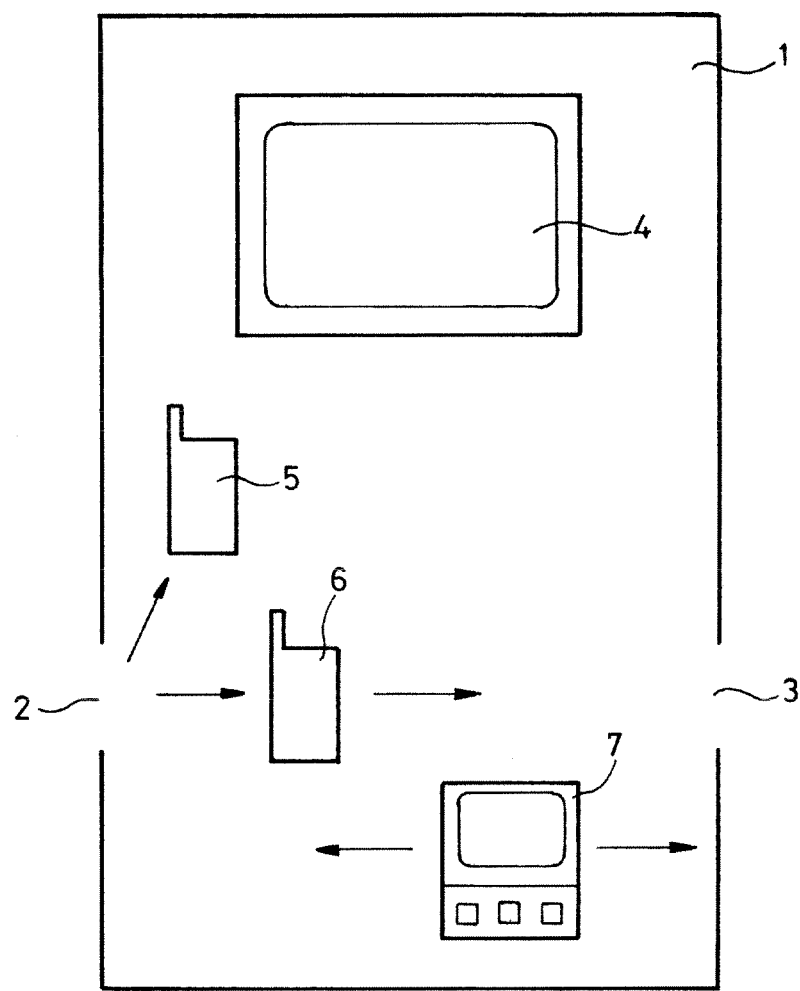
FIG_1

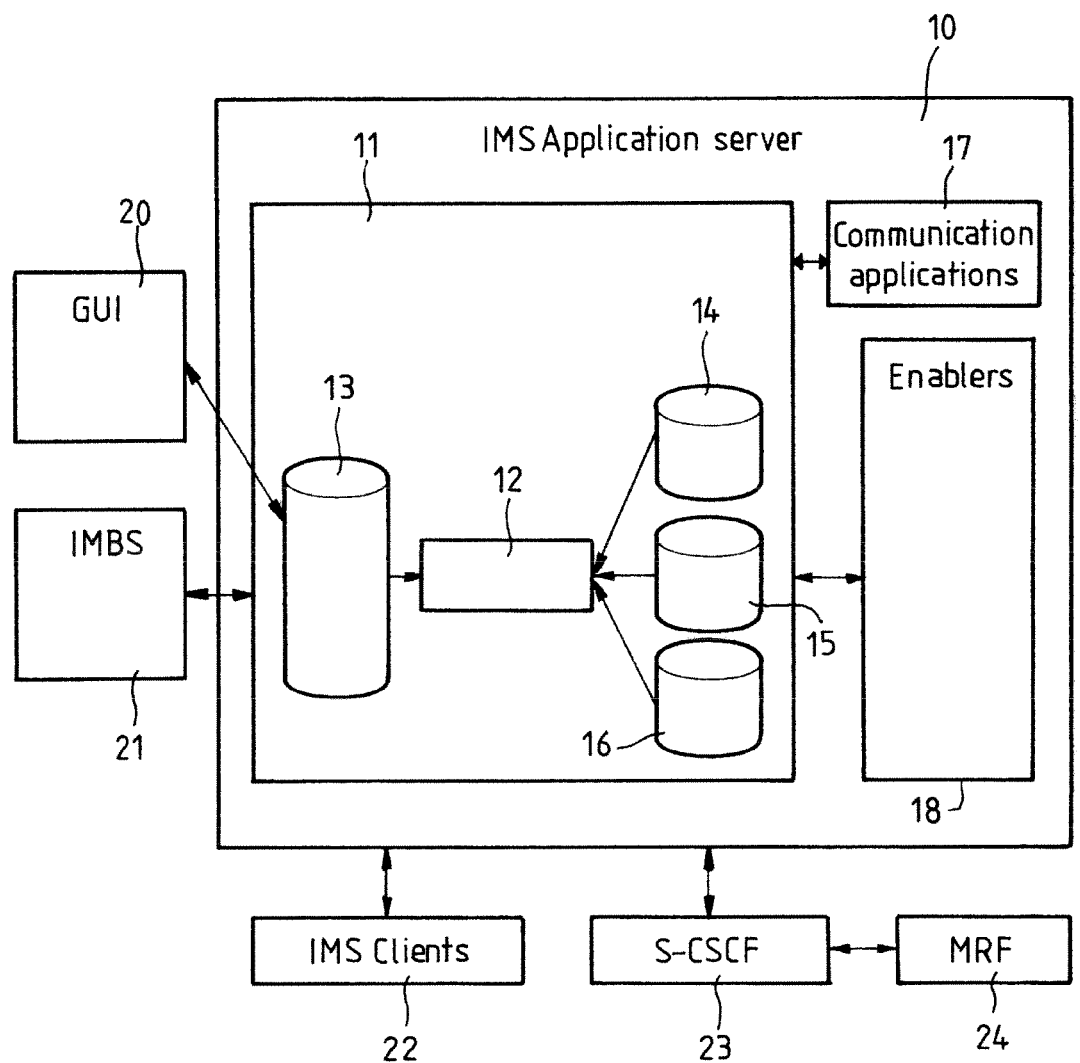
FIG_2

METHOD FOR ADAPTING A COMMON USER PROFILE

The invention concerns the creation and the use of a user profile for providing a service, and in particular a video and/or audio service intended for broadcast. The user profile is in particular used when either interactive aspects or a customized service are added to the broadcast service. The interactive part or the customized part, which is added to the broadcast common part of the service, depends on the user profile of the terminal on which the common part of the service is broadcast, said common part being the same for all terminals, or at least for a large number of terminals, having requested the service concerned. For example, the broadcast common part may be a television program, while the added part may be an interaction or specific advertising, or even both at the same time.

The user profiles are generally individual user profiles, in other words each user is associated with a terminal with which a user profile is associated. User groups may also be put together, but they take the form of a group of individual user profiles containing rules used for the management of the group while taking into account the specific features of the individual user profiles.

The invention concerns a specific case, in which several users are required to share a terminal, known as a common terminal since it is common to several users. In this case, any individual management of the set of user profiles associated with the different users sharing the common terminal is considered by the invention as non-optimal. In fact, each operation linked to a user profile will need to take into account complex rules connecting the different individual user profiles. The invention, however, proposes the creation of a common user profile, common to all users associated with the common terminal, with the service provider no longer seeing anything other than this common user profile and forgetting the different individual user profiles. Hence a return to a simple and standard operation for the service provider, which now only sees one user profile as usual, with the only difference being that this user profile represents a community and no longer an individual. As a result, in addition to the traditional user profile modifications on request from the user or the telecommunications operator managing the terminal(s) associated with the users, the common user profile must again be adapted when the composition of the community of users changes, or at least when the composition of the community of users changes sufficiently to lead to a substantial change in the common user profile. The modification of the community of users will thus lead to an interactive and dynamic adaptation of the common user profile.

The invention proposes both a method used to improve the common user profile by modifying the common user profile used and also a method used to improve the common user profile by using another common user profile already stored.

According to the invention, a method is planned for adapting the common user profile used by a service provider of audio and/or video broadcast on a common terminal to customize the service provided, including: a step of detecting at least one new terminal in the neighborhood of the common terminal; a step of enabling at least one new terminal detected on at least one first condition that it is to remain in the neighborhood of the common terminal for a duration compatible with the customization of the service provided; a step of determining one or more user profiles corresponding to one or more new enabled terminals; a step of correlating one or more predetermined profiles with one or more parameters representing the common profile used by the service provider so as to obtain a new common user profile; a step of implementation, by the service provider, of said new common user profile at least if the new common user profile is sufficiently different from the common user profile used by the service provider, to modify the customization of the service provided. Similarly, when a terminal disappears from the neighborhood of the common terminal, the invention proposes a method for adapting the common user profile. This is a method for adapting the common user profile used by a service provider of audio and/or video broadcast on a common terminal to customize the service provided, including: a step of detecting the disappearance, of at least one terminal, from the neighborhood of the common terminal; a step of enabling at least one terminal detected as disappeared on at least one first condition that it is to remain outside the neighborhood of the common terminal for a duration compatible with the customization of the service provided; a step of correlating one or more user profiles corresponding to terminals to remain in the neighborhood of the common terminal for a duration compatible with the customization of the service provided so as to obtain a new common user profile; a step of implementation, by the service provider, of the new common user profile at least if the new common user profile is sufficiently different from the common user profile used by the service provider, to modify the customization of the service provided. The addition of one or more terminals and the simultaneous withdrawal of one or more terminals should preferably be processed by the method according to the invention as a whole and simultaneously, within the same application server.

According to the invention, a method is also planned for adapting the common user profile used by a service provider of audio and/or video broadcast on a common terminal to customize the service provided, including: a step of detecting at least one new terminal in the neighborhood of the common terminal; a step of enabling at least one new terminal detected on at least one first condition that it is to remain in the neighborhood of the common terminal for a duration compatible with the customization of the service provided; a step of determining one or more user profiles corresponding to one or more new enabled terminals; a step of implementation, by the service provider, of a new previously-stored common user profile corresponding to all terminals still enabled, to modify the customization of the service provided. Among the terminals still enabled are the newly enabled terminals, as well as the terminals which, once enabled previously, have not been detected as disappearing with validation of their disappearance. Similarly, when a terminal disappears from the neighborhood of the common terminal, the invention proposes a method for adapting the common user profile. This is a method for adapting the common user profile used by a service provider of audio and/or video broadcast on a common terminal to customize the service provided, including: a step of detecting the disappearance, of at least one terminal, from the neighborhood of the common terminal; a step of enabling at least one terminal detected as disappeared on at least one first condition that it is to remain outside the neighborhood of the common terminal for a duration compatible with the customization of the service provided; a step of implementation, by the service provider, of a new previously-stored common user profile corresponding to all terminals still to remain in the neighborhood of the common terminal for a duration compatible with the customization of the service provided, to modify the customization of the service provided. The addition of one or more terminals and the simultaneous withdrawal of one or more terminals should preferably be processed by the method according to the invention as a whole and simultaneously, within the same application server.

The invention also proposes a method for creating a common user profile. It is a method for creating a common user profile, in which several existing user profiles are correlated so as to obtain a common user profile to be used by a service provider of audio and/or video broadcast on a common terminal to several users corresponding to the existing user profiles and which is to customize said broadcast service. The existing user profiles to be correlated may all be individual user profiles, or all common user profiles, or may include at least one individual user profile and at least one common user profile. The common user profile, to which the other user profiles will be correlated based on the modification of the composition of the community of users associated with the common terminal, may also have been defined, by the users themselves in agreement, in the same way as an individual user profile is defined by the corresponding user.

The invention will be better understood, and other characteristics and advantages will become apparent, upon reviewing the description below and the attached drawings, given by way of example, in which:

FIG. 1 represents in diagram form an example of the use of the method according to the invention with one common terminal and several individual terminals;

FIG. 2 represents in diagram form an example of implementation of the method according to the invention.

FIG. 1 represents in diagram form an example of the use of the method according to the invention with one common terminal and several individual terminals. A room in a home 1, for example a lounge, has two openings 2 and 3, for example doors, through which both users and the terminals they are carrying may enter and exit. In room 1 there is a common terminal 4, for example the television of the lounge which may be watched simultaneously by several members of the family living in the home. Several terminals 5 to 7 are found at a given time in room 1, for example two mobile telephones 5 and 6 and a personal digital assistant (PDA) 7. These mobile terminals are each associated with one user. Therefore, the presence of terminal 5, 6 or 7, in room 1, indicates the presence of the user respectively associated with said terminal.

In room 1, a common user profile is used by a service provider of audio and/or video broadcast on the common terminal 4 to customize the service provided. Here, the common user profile corresponds for example to the user profile of terminal 7, which is in constant movement in room 1; this may for example be the father of the family who is doing the housework in room 1 while occasionally watching the television. The common user profile may already be the correlation of several individual user profiles if several terminals were already in room 1. At this moment, a user enters room 1 carrying terminal 5 which soon becomes immobile for a long time; this may for example be the mother of the family who has sat in an armchair to watch the television. A detection system not shown in FIG. 1, independent of the common terminal 4 or integrated into the common terminal 4, detects the entry into room 1 of terminal 5. In another embodiment, it is terminal 5 which may signal to said detection system or even directly to the common terminal 4. The extended presence of terminal 5 in the neighborhood of the common terminal 4 is detected, or a request comes from terminal 5, which leads to the assumption that the user of terminal 5 is interested in what is happening at the common terminal 4. The neighborhood of the common terminal preferably means a space around the common terminal in which the user of a terminal is liable to be able to benefit at least in part from the service broadcast on the common terminal. As long as terminal 5 is to remain in the neighborhood of the common terminal 4 for a duration compatible with the customization of the service provided at the common terminal 4, which is the case either if terminal 5 actively signals itself or if terminal 5 remains for a long time in the neighborhood of the common terminal 4, in this case in room 1, this terminal is enabled, in other words it is considered that its user is interested in the service broadcast on the common terminal 4. The next step, or one of the next steps, in the customization of the service provided, will take into account terminal 5. For this to be of interest, the predicted time for which terminal 5 will be present in room 1 must not be too short, so as to allow the customization of the service provided; if in the time required to customize the service taking into account the user of terminal 5, this user and terminal 5 have already left the room 1, the modification of the customization is of no interest. For example, terminal 5 is assumed to remain in room 1, at least for the time required for one or more customizations, for example of advertising messages, for the service broadcast on the common terminal 4, for example video, to have been viewed by the user of terminal 5. Once terminal 5 has been enabled, if it respects at least the first condition detailed above and if applicable one or more other possible conditions, the user profile 5 is used to obtain a new common user profile in a way which will be detailed during the description of FIG. 2. The new common user profile corresponds to a correlation of the user profiles associated with terminals 5 and 7 respectively. At this point, let us suppose that another user crosses room 1, entering through door 2 and exiting shortly afterwards through door 3. Of course, this user does not actively signal to the common terminal 4, since they are not interested in the service being broadcast. The possible detection system of terminals to be enabled does detect terminal 6 on its entry into room 1. However, since terminal 6 is soon, in other words in too short a time to allow customization of the service broadcast using the user profile corresponding to terminal 6 and the viewing for a sufficient time of this service customized for the user of terminal 6, such as for example before the expiry of a predetermined period of time, no longer detected by the detection system, the new common user profile of the common terminal 4 remains identical and is not therefore modified to take into account the specific features of the user profile associated with terminal 6. Conditions other than the distinction between stationary users in relation to the common terminal and passing users can be used to determine whether or not to trigger a recalculation of the common user profile. Once a new terminal is detected and it is assumed to be stationary in relation to the common terminal, the system can check one or more other conditions for this terminal before recalculating the common user profile, so that the expected gain by the service provider through the modification of the customization of the service broadcast is greater than the cost of recalculating the common user profile. Other conditions based on the number or the proportion of new terminals detected will be detailed later.

A concrete example of the modification of the common user profile with images will now be given. Alice is watching a football match on the television of the family home, settled into an armchair in the lounge. Through the mobile telephone in her pocket, Alice has been detected and her user profile will constitute the common user profile associated with the television. Alice's user profile indicates that she is a woman who likes beer and chocolate. Advertising for beer brands will be displayed on the screen during the football match. Her son Bob enters the lounge for the second half of the football match and sits on the sofa. Bob is detected through the PDA with which he is playing while watching the football match. Bob's user profile indicates that he is a young man who likes chocolate and lemonade. The correlation between Alice's and Bob's user profiles shows a point they have in common: they both like chocolate. For the second half of the football match, advertising for various chocolate brands will be displayed on their screen.

Any common user profile, including a certain number of users, especially when it is stored, can include for example all or some of the following elements: number of users included in the common user profile, the ages of the different users included in the common user profile, the average age of the group made up by the different users included in the common user profile, their respective location at a given time, their common center of interests, the type of television program usually watched together, the type of community that these users make up (a family, a group of friends, etc.), all the individual user profiles, the type of service generally required, etc.

FIG. 2 represents in diagram form an example of implementation of the method according to the invention. The arrows represent exchanges of information.

An IMS ("Internet protocol Multimedia Subsystem") application server 10 can in particular be connected to a GUI ("Guide User Interface") graphical user interface 20 allowing both the users and the operator to define the policies for determining a common user profile, to an interactive television management platform 21, preferably IMBS ("Interactive Mobile Broadcast Service") but which can also be fixed, used to add interactive features to a broadcast television transmission content, to IMS clients 22 located in the user terminals allowing the IMS application server 10 to detect them, to providers 24 of multimedia services, for example audio and video, using call state control function (S-CSCF or "Serving Call State Control Function") servers 23, in particular responsible for providing the control session for the services of a user and maintaining the states of the session of a registered user, where said multimedia services can be displayed on the common terminals.

An IMS application server 10 ("Internet protocol Multimedia Subsystem") contains a "common user profile" application server 11, a communication applications group 17 and a group of enablers 18. The method according to the invention can also be implemented in a non-IMS application server, such as for example in a network management platform, in particular for a video on demand in ADSL ("Asymmetric Digital Subscriber Line"), or for interactive television in ADSL. The use of an IMS application server does however remain more beneficial since it facilitates the correspondence between the identifier of an individual terminal on the one hand and the individual user profile associated with said individual terminal on the other hand. The communication applications group 17 can in particular include applications allowing interactions with the user, for example PTT ("push to talk"). The group of enablers 18 can in particular include an AAC ("Authentication and Access Control") service responsible for access control, a presence service used to find out whether the person is available and what communication resources they have available, a GLMS service responsible for managing the lists of users, a billing service, a service quality control service, a location service giving information relating to the locations in which the different users are found, which generally accompany the supply of multimedia services within an IMS application server 10.

The "common user profile" application server 11 includes a rules engine 12, a directory 13 of policies for determination of a common user profile, a directory 14 of individual user profiles, a directory 15 of common terminals, a directory 16 of common user profiles.

The "common user profile" application server 11 determines, preferably with the help of the directory 14 of individual user profiles, the user profiles corresponding to the new terminals detected and enabled, referred to henceforth as new individual user profiles. These user profiles can also be requested directly from an HSS (Home Subscriber Server) server not shown in FIG. 2, which contains the individual user profiles associated with the terminals. In practical terms, the "common user profile" application server 11 shall preferably use the HSS server at least the first time to complete the directory 14 of individual user profiles.

The directory 15 of the common terminals indicates for each common terminal a reference to a common user profile. The directory 16 of the common user profiles includes the common user profiles already associated with common terminals. For a given common terminal, through directory 15 of the common terminals, the "common user profile" application server 11 obtains a common user profile reference. Through this reference, the "common user profile" application server 11 obtains, using the directory 16 of the common user profiles, the last common user profile associated with the common terminal concerned, referred to henceforth as the old common user profile.

Using firstly the directory 13 of the policies for determination of the common user profile, which contains the policies explaining how a new common user profile should be determined from one or more individual user profiles to be added to or removed from an old common user profile, and secondly both the old common user profile and the new individual user profile(s), the rules engine 12 is able to determine the new common user profile which will then be used in the common terminal concerned. In more general terms, a correlation of the user profile(s) determined with one or more parameters representing the common user profile used by the service provider is carried out so as to obtain a new common user profile. Examples of representative parameters are given later.

The new common user profile may be either systematically used by the service provider to modify the customization of the service provided, or only be used if the new common user profile is sufficiently different from the common user profile used by the service provider, In fact, if the modification of the customization of the service appears insignificant to the operator or imperceptible to the users, the method according to the invention may not take into account the new common user profile and choose to retain and continue to use the old common user profile.

The rules engine 12 does not necessarily have to systematically recalculate a new common user profile. It has the possibility of searching in the directory 16 of the common user profiles for a common user profile corresponding to all user profiles associated with terminals still enabled at a given time, as long as this common user profile has been previously stored in the directory 16 of the common user profiles. For example at a given time, a common terminal is associated with one common user profile corresponding to three individual user profiles—Alain, Bernard and Christophe. Christophe leaves the neighborhood of the common terminal. Instead of recalculating the new common user profile, the rules engine 12 will simply look in the directory 16 of the common user profiles to see whether it already contains a common user profile corresponding to Alain's and Bernard's individual user profiles.

The broadcast service, audio and/or video, should preferably be at least a video service, in other words it should preferably include video. A purely audio service remains possible but is of less interest since it is considerably less rich in content and therefore of less interest from a service customization point of view. In one embodiment, the video service includes the sending of a video advertising sequence during a televised transmission. In another embodiment, the video service includes the sending of interactive video questions during a televised transmission. The two embodiments can also be combined within the same service.

For the detection step and the enabling step, in particular two embodiment methods can be envisaged, either alternating or combined, in other words the methods may possibly coexist within a common terminal. In a first embodiment method, the detection step corresponds to a passive detection for the detected terminal and the enabling step is carried out if said detected terminal remains detectable for a predetermined period of time. This minimum latent time is a means of checking, if not the desire then at least a reasonable probability of desire, either to belong to the group of users defining the common user profile associated with the common terminal, or at least to belong to a group of users effectively benefiting from the service broadcast on the common terminal. This minimum latent time is also used to avoid constantly recalculating new common user profiles which have no practical interest since they are not intended to last long enough to be profitable from a financial point of view for the supplier of the broadcast service. In a second embodiment method, the detection step corresponds to an active signaling from the detected terminal and the enabling step is then carried out automatically. In the event of coexistence, the priority rule can in particular be as follows: if the "active" mode is enabled, it is used, otherwise the "passive" mode is used.

For the enabling step, the condition for positioning the individual terminal in the neighborhood of the common terminal must be verified, but it is not necessarily the only condition which needs to be verified. A second condition aiming to measure the expected disruption on the common user profile by the integration of one or more new individual user profiles should preferably also be used, in order to avoid constantly recalculating the common user profile when it is considered that the result of the recalculation will lead to hardly any difference. In one embodiment method, the enabling step also verifies a second condition of a minimum number, strictly greater than one, of new terminals verifying the first condition. In another embodiment method, the enabling step also verifies a second condition of a minimum proportion of new terminals verifying the first condition in relation to all terminals which make up the common user profile used by the service provider. An example of a minimum proportion may be 10%, in particular in situations with a large number of users, for example when the common terminal is in a public place such as an airport or a station concourse or an underground station, for example.

During the correlation operation, the new individual user profiles are correlated with one or more parameters representing the old common user profile. In one embodiment method, the representative parameter(s) are the user profile(s) of the terminals which make up the common user profile used by the service provider. In this case, the new common user profile is directly recalculated from all of the individual user profiles to be associated with the common terminal. This embodiment method has the advantage of a greater subtlety in the determination of the new common user profile. In another embodiment method, the representative parameter(s) are the common user profile used by the service provider. In this case, the new common user profile is obtained by the application of a disruption to the old common user profile, the disruption corresponding to the new individual user profile(s). This embodiment method has the advantage of a lower cost for the determination of the new common user profile, but is a bit rougher in the determination of the new common user profile.

The correlation between user profiles can be carried out in several different ways. By way of example, in one embodiment, the correlation step includes a function for the intersection of at least certain user profile characteristics. In another embodiment, the correlation step includes a function for the exclusion of at least certain user profile characteristics if priority user profiles are present. In yet another embodiment, the correlation step includes a function for the calculation of the barycenter of at least certain user profile characteristics. Several, or even all, of these different embodiments can be combined.

The invention claimed is:

1. A method for adapting the common user profile used by a service provider of audio and/or video broadcast on a common terminal to customize the service provided, including: —detecting at least one new terminal in the neighborhood of the common terminal; —enabling at least one new terminal detected on at least one first condition that it is to remain in the neighborhood of the common terminal for a duration compatible with the customization of the service provided and wherein the enabling further comprises verifying a second condition of at least one of: a minimum number, strictly greater than one, of new terminals verifying the first condition and a minimum proportion of new terminals verifying the first condition in relation to all terminals which make up the common user profile used by the service provider; —determining one or more user profiles corresponding to one or more new enabled terminals; —correlating one or more of the determined user profiles with one or more parameters representing the common profile used by the service provider so as to obtain a new common user profile; and —implementation, by the service provider, of said new common user profile at least if the new common user profile is sufficiently different from the common user profile used by the service provider, to modify the customization of the service provided.

2. The method for adapting the common user profile according to claim 1, wherein the representative parameter(s) are the user profile(s) of the terminals which make up the common user profile used by the service provider.

3. The method for adapting the common user profile according to claim 1, wherein the representative parameter(s) are the common user profile used by the service provider.

4. The method for adapting the common user profile according to claim 1, wherein the correlation includes a function for the intersection of at least certain user profile characteristics.

5. The method for adapting the common user profile according to claim 1, wherein the correlation includes a function for the exclusion of at least certain user profile characteristics if priority user profiles are present.

6. The method for adapting the common user profile according to claim 1, wherein the correlation includes a function for the calculation of the barycenter of at least certain user profile characteristics.

7. A method for adapting the common user profile used by a service provider of audio and/or video broadcast on a common terminal to customize the service provided, including: —detecting at least one new terminal in the neighborhood of the common terminal; —enabling at least one new terminal detected on at least one first condition that it is to remain in the neighborhood of the common terminal for a duration compatible with the customization of the service provided and wherein the enabling further comprises verifying a second condition of at least one of: a minimum number, strictly greater than one, of new terminals verifying the first condition and a minimum proportion of new terminals verifying the first condition in relation to all terminals which make up the common user profile used by the service provider; —determining one or more user profiles corresponding to one or more new enabled terminals; and —implementation, by the service provider, of a new previously-stored common user profile corresponding to all terminals still enabled, to modify the customization of the service provided.

8. The method for adapting the common user profile according to claim 1, wherein the detecting step corresponds to a passive detection for the detected terminal and the enabling is carried out if said detected terminal remains detectable for a predetermined period of time.

9. The method for adapting the common user profile according to claim 1, wherein the detecting step corresponds to an active signaling from the detected terminal and the enabling is then carried out automatically.

10. The method for adapting the common user profile according to claim 1, wherein the service is at least a video service.

11. The method for adapting the common user profile according to claim 10, wherein the video service includes the sending of a video advertising sequence during a televised transmission.

12. The method for adapting the common user profile according to claim 10, wherein the video service includes the sending of interactive video questions during a televised transmission.

13. A method for adapting a common user profile used by a service provider of audio and/or video broadcast on a common terminal to customize a service provided, including: —detecting the disappearance, of at least one terminal, from the neighborhood of the common terminal; —enabling at least one terminal detected as disappeared on at least one first condition that it is to remain outside the neighborhood of the common terminal for a duration compatible with the customization of the service provided and wherein the enabling further comprises verifying a second condition of at least one of: a minimum number, strictly greater than one, of disappeared terminals verifying the first condition and a minimum proportion of disappeared terminals verifying the first condition in relation to all terminals which make up the common user profile used by the service provider; —correlating one or more user profiles corresponding to terminals to remain in the neighborhood of the common terminal for a duration compatible with the customization of the service provided so as to obtain a new common user profile; and —implementation, by the service provider, of said new common user profile at least if the new common user profile is sufficiently different from the common user profile used by the service provider, to modify the customization of the service provided.

14. A method for adapting the common user profile used by a service provider of audio and/or video broadcast on a common terminal to customize the service provided, including: —detecting the disappearance, of at least one terminal, from the neighborhood of the common terminal; —enabling at least one terminal detected as disappeared on at least one first condition that it is to remain outside the neighborhood of the common terminal for a duration compatible with the customization of the service provided and wherein the enabling further comprises verifying a second condition of at least one of: a minimum number, strictly greater than one, of disappeared terminals verifying the first condition and a minimum proportion of disappeared terminals verifying the first condition in relation to all terminals which make up the common user profile used by the service provider; and —implementation, by the service provider, of a new previously-stored common user profile corresponding to all terminals still to remain in the neighborhood of the common terminal for a duration compatible with the customization of the service provided, to modify the customization of the service provided.

15. An application server including both a first application server portion adapted to implement a method for adapting a common user profile used by a service provider of audio and/or video broadcast on a common terminal to customize a service provided by detecting at least one new terminal in the neighborhood of the common terminal, enabling at least one new terminal detected on at least one first condition that it is to remain in the neighborhood of the common terminal for a duration compatible with the customization of the service provided and wherein the enabling further comprises verifying a second condition of at least one of: a minimum number, strictly greater than one, of new terminals verifying the first condition and a minimum proportion of new terminals verifying the first condition in relation to all terminals which make up the common user profile used by the service provider;
    determining one or more user profiles corresponding to one or more new enabled terminals, correlating one or more of the determined user profiles with one or more parameters representing the common profile used by the service provider so as to obtain a new common user profile and implementing said new common user profile at least if the new common user profile is sufficiently different from the common user profile used by the service provider, to modify the customization of the service provided and a second application server portion adapted to the implementation of the method for adapting the common user profile used by the service provider of audio and/or video broadcast on the common terminal to customize the service provided by detecting the disappearance, of at least one terminal, from the neighborhood of the common terminal, enabling at least one terminal detected as disappeared on at least one first condition that it is to remain outside the neighborhood of the common terminal for a duration compatible with the customization of the service provided and wherein the enabling further comprises verifying a second condition of at least one of: a minimum number, strictly greater than one, of terminals detected as disappeared verifying the first condition and a minimum proportion of terminals detected as disappeared verifying the first condition in relation to all terminals which make up the common user profile used by the service provider, correlating one or more user profiles corresponding to terminals that remain in the neighborhood of the common terminal for a duration compatible with the customization of the service provided so as to obtain a new common user profile
    and implementing said new common user profile at least if the new common user profile is sufficiently different from the common user profile used by the service provider, to modify the customization of the service provided.

16. An application server including both a first application server portion adapted to implement a method for adapting a common user profile used by a service provider of audio and/or video broadcast on a common terminal to customize a service provided by detecting at least one new terminal in the neighborhood of the common terminal, enabling at least one new terminal detected on at least one first condition that it is to remain in the neighborhood of the common terminal for a duration compatible with the customization of the service provided and wherein the enabling further comprises verifying a second condition of at least one of: a minimum number, strictly greater than one, of new terminals verifying the first condition and a minimum proportion of new terminals verifying the first condition in relation to all terminals which make up the common user profile used by the service provider, determining one or more user profiles corresponding to one or more new enabled terminals and implementing a new previously-stored common user profile corresponding to all terminals still enabled, to modify the customization of the service provided and a second application server portion adapted to the implementation of the method for adapting the common user profile used by the service provider of audio and/or video broadcast on the common terminal to customize the service provided by detecting the disappearance, of at least one terminal, from the neighborhood of the common terminal, enabling at least one terminal detected as disappeared on at least one first condition that it is to remain outside the neighborhood of the common terminal for a duration compatible with the customization of the service provided and wherein the enabling further comprises verifying a second condition of at least one of: a minimum number, strictly greater than one, of terminals detected as disappeared verifying the first condition and a minimum proportion of terminals detected as disappeared verifying the first condition in relation to all terminals which make up the common user profile used by the service provider, and implementing a new previously-stored common user profile corresponding to all terminals still to remain in the neighborhood of the common terminal for a duration compatible with the customization of the service provided, to modify the customization of the service provided.

* * * * *